United States Patent
Lam et al.

[11] Patent Number: 5,926,636
[45] Date of Patent: *Jul. 20, 1999

[54] REMOTE PROCEDURAL CALL COMPONENT MANAGEMENT METHOD FOR A HETEROGENEOUS COMPUTER NETWORK

[75] Inventors: Geoffrey T. Lam, San Jose; Ajay Malik, Fremont; Senthil K. Ponnuswamy, San Jose; Thomas M. Battle, Los Altos Hills, all of Calif.

[73] Assignee: Adaptec, Inc., Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/603,531

[22] Filed: Feb. 21, 1996

[51] Int. Cl.[6] ............................. G06F 13/14; G06F 9/44
[52] U.S. Cl. ................. 395/683; 395/200.62; 395/684
[58] Field of Search ............................. 395/683, 200.01, 395/800, 615, 670, 200.12, 200.15, 210.16, 672, 335, 326, 200.61, 200.57, 684, 800.23, 200.79, 200.31, 200.62; 379/60, 45; 329/94.3, 60

[56] References Cited

U.S. PATENT DOCUMENTS

| | | | |
|---|---|---|---|
| 5,278,955 | 1/1994 | Fortéet al. | 395/200.01 |
| 5,329,619 | 7/1994 | Pagé et al. | 395/200.01 |
| 5,434,908 | 7/1995 | Klein | 379/88 |
| 5,475,836 | 12/1995 | Harris et al. | 395/681 |
| 5,581,461 | 12/1996 | Coll et al. | 395/205 |

*Primary Examiner*—Daniel H. Pan
*Attorney, Agent, or Firm*—Forrest Gunnison

[57] ABSTRACT

In response to a component management function call by a remote client application, the component management application programming interface (API) generates a message that identifies the called function and the version of the component management API. The component management API calls a local message transfer RPC command to send the message to a RPC command module. The RPC command module processes the local message transfer RPC command, and packages the message for transfer as a RPC over the heterogenous network. The RPC command module sends the packaged RPC to a network stack which in turn transmits the packaged RPC over the heterogenous network to a network stack in the server computer. The server network stack provides the packaged RPC to a server RPC command module that unpacks the RPC in a conventional manner to obtain the original message. The message is passed to a server component management API. The server component management API parses the message to determine the computer architecture of the client computer. With this information, server component management API reads the version specified in the message. If the specified version is incompatible with the version of the server component management API, a reply indicating the version incompatibility is transmitted to remote client application and otherwise the message is processed further by the server component management API.

15 Claims, 7 Drawing Sheets

REMOTE PROCEDURAL CALL COMPONENT MANAGEMENT METHOD FOR A HETEROGENEOUS COMPUTER NETWORK

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

The present invention is related generally to communications across a computer system network and more specifically to methods for managing components in a heterogeneous computer system network.

2. Description of Related Art

A current trend in computing is to interconnect a variety of computer architectures and computer operating systems in a single network 100. As illustrated in FIG. 1, network 100 includes a variety of servers, i.e., a Unix server 150, a Netware server 160, an OS/2 server 170, and a Windows NT server 180. Herein, network 100 and similar networks are referred to as heterogeneous networks. Heterogeneous networks include local area networks.

One configuration commonly used for performing operations over a network, such as network 100, is a client/server architecture. A server process executing on a server computer is a provider of services. Servers include file servers, database servers, transaction servers, groupware servers and object servers.

A client process, that is executing either on a server computer or another computer, is a consumer of services provided by the server. Thus, in FIG. 1, three computers 110, 120 and 130, that are each running a client process, are illustrated.

Clients and servers are loosely coupled systems that interact over network 100. Each interaction between a client and a server tells a server which service is requested. After the server receives the request, the server determines how to perform the service specified in the request.

Communications between a client and a server over heterogeneous network 100 require a method for transporting requests over network 100 from a client running under one operating system to a server that is either running under another operating system, or the same operating system. One widely used method for communication over heterogeneous network 100 is a remote procedure call (RPC). Techniques for implementing client/server applications, and client/server applications with remote procedure calls are known to those skilled in the art. A remote procedure call (RPC) hides the physical structure of network 100 and makes a server on network 100 appear to be one function call away. Specifically, a remote procedure call hides the details of network 100 by using a procedure call mechanism that is well known.

A common way to illustrate implementation of a remote procedure call is a stack. FIG. 2 is an example of one prior art representation of a stack 200 that includes two common implementations of a RPC. One widely used RPC standard is distributed computing environment (DCE) RPC (FIG. 2). A DCE RPC allows a client to interoperate with one or more servers on other computing platforms, even when the client and server are from different vendors with different operating systems.

DCE is associated with an interface definition language (IDL) and compiler that facilitate creation of RPCs. The IDL compiler creates source code stubs for both the client and server sides of an application. The stubs are compiled and linked to the RPC run-time library, which is responsible for finding servers in a distributed system, performing the message exchanges, packing and unpacking the message parameters, and processing any errors that occur. The DCE RPC does not support transactions.

One problem encountered in using RPCs is the representation of data across a network with multiple platforms, because different CPUs represent data structures differently, for example, Big-Endian versus Little-Endian. To maintain machine independence, the RPC uses some level of data format translation across systems.

With DCE, the client chooses one of the multiple data format representations from the network data representation (NDR) service. (See FIG. 2.) The client chooses the data format, typically its own native data representation; tags the data with the chosen format; and the server must transform the data into a format that the server understands.

Another common RPC is provided by Sun Microsystems of Mountain View, Calif. RPC on Sun Microsystems computers requires that the client convert the data to a neutral canonical format using an external data representation (XDR). (See FIG. 2.) With the Sun approach, all clients look the same to a server. In FIG. 2, NetBios, sockets and transport layer interface (TLI) are all interfaces between RPC and the various network transport stacks. Network transport stacks include TCP/IP, NetBIOS, IPX/SPX, DECnet, AppleTalk, OSI, and SNA/APPN, for example. There is a logical interface to the network device drivers at the bottom of the network transport stack. Examples of widely supported logical interfaces to network device drivers are Microsoft/3Com's NDIS and Novell's ODI. The remainder of the standards, drivers, and communication protocols in FIG. 2 are known to those of skill in the art and are shown only for completeness. A more complete discussion of transport stacks is provided, for example, in Tannenbaum, *Computer Networks*, Prentice Hall, (1988). Herein, a network stack refers to network stack 250.

RPCs are used widely. However, for desktop management of components within a single desktop computer system, another approach is used. A Desktop Management Interface (DMI) has been defined by the Desktop Management Task Force, MIS JF2-51, 2111 N.E. 25th Avenue, Hillsboro, Oreg. 97124. DMI is a local interface between management applications that manipulate information on components, e.g., physical or logical entities in a computer system, and the components. For a detailed description of DMI, see the *Desktop Management Interface Specification*, Version 1.0, Apr. 29, 1994, which is incorporated herein by reference in its entirety.

FIG. 3 is a block diagram of DMI within computer system 300. Management applications 301-1 to 301-n use a management interface 310 to manage components 302-1 to 302-i within computer system 300. Management applications include a management console, a desktop management application, and a local area network management application. In general, a management application is a remote or local application that changes, interrogates, controls, tracks, or lists components of a desktop computer system.

Management interface 310 shields management applications 301-1 to 301-n from the different mechanisms used to obtain management information from components 302-1 to 302-i within computer system 300. Typical components include software applications, operating systems, hardware products, peripheral products, and system hardware. Each component has a management information file (MIF), that describes the manageable characteristics of the component, stored in a MIF database 340 within computer system 300.

Management interface 310 is a data interface, as opposed to the procedural interface used in a RPC. Data blocks describe the format for data transfer instead of parameters to a function call. Thus, a command is issued from a management application, for example, management application 301-1, to build a data block and pass the data block to service layer 320. All commands are specified with data blocks, but there is one function call provided to pass the command to service layer 320.

Service layer 320 is a desk-top resident application that controls the flow of information between management interface 310 and a component interface 330. Service layer 320 is a permanent background process that is always ready to handle an asynchronous request. The operations of the service layer are documented in Chapter 2 of the *Desktop Management Interface Specification*.

Component interface 330 receives calls from service layer 320. Component interface 330 also is a data interface, and so data blocks describe the format for data transfer. Communication between component interface 330 and service layer 320 is operating system dependent.

While DMI provides a useful function for the desktop, the data interface, i.e., command blocks, is a departure from RPC. The current trend for management of components in a heterogeneous network is to use RPC.

FIG. 4 is a block diagram of a client/server architecture used over a network, e.g. a heterogeneous network, to manage hardware components. A remote client application 411, that needs to interact with a hardware component on server computer 420, uses RPCs to communicate over heterogeneous network 400 with server computer 420.

For example, remote client application 411 is a graphic user interface (GUI) such as that used on a Windows workstation. A remote I/O management application programming interface 412 (IOMAPI 412) is provided to remote client application 411 by a remote client interprocess communication module 413.

IOMAPI 412 includes general I/O management functions, RAID management functions, and an administration application programming interface (API). The functions available to remote client application 411 in IOMAPI 412 are the same as those made available to a local client application 435 on server computer 420 by server IPC module 423. Function calls to IOMAPI 412 by remote client application 411 result in I/O management on server computer 420. The administration calls by remote client application 411 through IOMAPI 412 are used for establishing a network session, and for ensuring the authentication and access rights of applications issuing IOMAPI calls.

A call to a function in IOMAPI 412 by remote client application 411 is passed to RPC command client 414. RPC command client 414 packages the function call in a conventional fashion and transmits the packaged function call to network stack 415, which in turn controls transmission of the packaged function call over network 400 to network stack 425 of server computer 420.

To package the request, RPC command client 414 converts the function call and any associated data to a neutral canonical format using an external data representation (XDR). Thus, in FIG. 4, IOMAPI 412 and RPC command client 414 are functionally the RPC layer of FIG. 2.

Network stack 425 transmits the packaged function call to server RPC command module 424. Server RPC command module 424 extracts the function call from the packaged request. If the function call is an administration function call, server RPC command module 424 processes the administration function call and replies to RPC command client 414 that in turn communicates with remote client application 411. However, if the function call is an IOMAPI function call, server RPC command module 424 passes the function call to server IPC module 423. Server IPC module 423 transfers the specified function call via a message buffer IPC_MESSAGE to an I/O manager 430 with an interface to server IPC module 423. Message buffer IPC_MESSAGE, sometimes called message IPC_MESSAGE, is transmitted using an interprocess communication. In response to message IPC_MESSAGE, I/O manager 430 issues a call to the appropriate management function.

I/O manager 430 performs the called management function and returns the result to server IPC module 423. The results are returned from server IPC module 423 to remote client application 411 in the normal manner for a RPC.

While the architecture of FIG. 4 overcomes the limitations of DMI by using a RPC mechanism, the use of RPCs introduces limitations on updates and modifications. Any change in remote IOMAPI 412 and/or local IOMAPI 422 requires a change in RPC command client 414 and RPC command module 424. Any change in RPC command client 414 and RPC command module 424 implies changes in remote client application 411. The RPC interface must support every single command that's defined in the list of procedure calls for every possible version and must support every one of the parameters that are passed with each of these procedure calls.

Hence, RPC may not work properly in an environment with mixed versions of remote IOMAPI 412 and local IOMAPI 422. To assure version capability across heterogeneous network 400, remote client IPC module 413, client RPC command module 414, server RPC command module 424 and server IPC module 423 must be updated to support each version, recompiled, and relinked for each of the computers on network 400. For heterogeneous networks, this is a formidable task. Thus, while the trend is to implement RPC for component management over a heterogeneous network, the requirement of the current RPC architecture for either consistent versions or support of all versions throughout such a network will limit the actual utilization of RPC for component management.

SUMMARY OF THE INVENTION

According to the principles of this invention, a computer process for using remote procedure calls over a heterogeneous computer network overcomes the problems associated with supporting different versions of application programming interfaces by remote procedure call modules on client and server computers, i.e., first and second computers. Moreover, the remote procedure call process of this invention is independent of the architecture of the computer platforms on the network, i.e., the process can be used between computers having different computer architectures.

Unlike prior art RPC modules that were required to support every single command that was defined in the list of procedure calls for every possible version, the RPC modules of this invention support only a single RPC command that transfers a buffer of information. The particular information in the buffer does not affect the operation of the RPC module. Consequently, the RPC modules are independent of the client applications and application programming interfaces with which the RPC modules interact.

In one embodiment, a message buffer in a first computer is filled with information (including a version of an application programming interface on the first computer) by the client application, executing on the first computer, calling a function in the application programming interface. The application programming interface issues a message transfer remote procedure call to a remote procedure call module on the first computer to transfer the message buffer over the heterogeneous computer network to a second computer.

Each of a plurality of functions called in the application programming interface fill the message buffer and then call the single remote procedure call command to transfer the message buffer. Preferably, the information in the message buffer is one byte-aligned.

When the message buffer is received in the second computer, the version of the application programming interface in the message buffer is compared with a version of an application programming interface on the second computer. Specifically, in one embodiment a plurality of version identifiers of the application programming interface on the first computer are compared with a plurality of version identifiers of the application programming interface on the second computer.

If the comparison of the version of the application programming interface in the message buffer with a version of an application programming interface on the second computer indicates that the versions are compatible, processing of the message is continued on the second computer. Conversely, if the versions are incompatible, an error is placed in the message and the message is returned to the first computer.

Prior to comparing the versions on the second computer, a field is read in the message that includes an identifier of the computer architecture of the first computer, e.g., the addressing format. If the computer architecture of the first computer is incompatible with the computer architecture of the second computer, the message is converted to a form that is compatible with the second computer prior to making the version comparison.

In another embodiment of this invention, a component management function call is issued from a remote client application on a remote client computer to a remote client component management application programming interface on the remote client computer. In response to the remote client component management function call, the remote client component management application programming interface builds a message in a buffer memory of the remote client computer. The message includes an identifier for the called component management function and a version of the component management application programming interface.

The remote client component management application programming interface sends the message to a server computer on a heterogeneous computer network using a remote procedure call command module. The remote procedure call command module is independent of the called component management function.

Specifically, to send the message, the remote client component management application programming interface calls a local message transfer remote procedure call command to transfer the message from the client component management application programming interface to the remote procedure call module on the client computer.

The remote procedure call module packages the message for transfer over the heterogeneous computer network. The remote call module transmits the packaged message to a first network stack on the client computer which in turn transmits the packaged message from the first network stack to a second network stack on a server computer. The packaged message is transmitted from the second network stack to a server RPC command module on the server computer. The server RPC command module converts the packaged message back to the message. The message is then transferred from the server RPC command module to a server component management application programming interface on the server computer.

The server component management application programming interface reads a field in the message to determine whether an addressing format of the client computer is compatible with an addressing format of the server computer. If the addressing formats are not compatible, the server component management application programming interface converts the message to an addressing format compatible with the server computer.

After the checking of the addressing format and the conversion if necessary, the versions are checked as described above. The elimination of the version dependency of the RPC module facilitates use of RPCs in a wide variety of heterogeneous networks.

DETAILED DESCRIPTION

Figure 1:
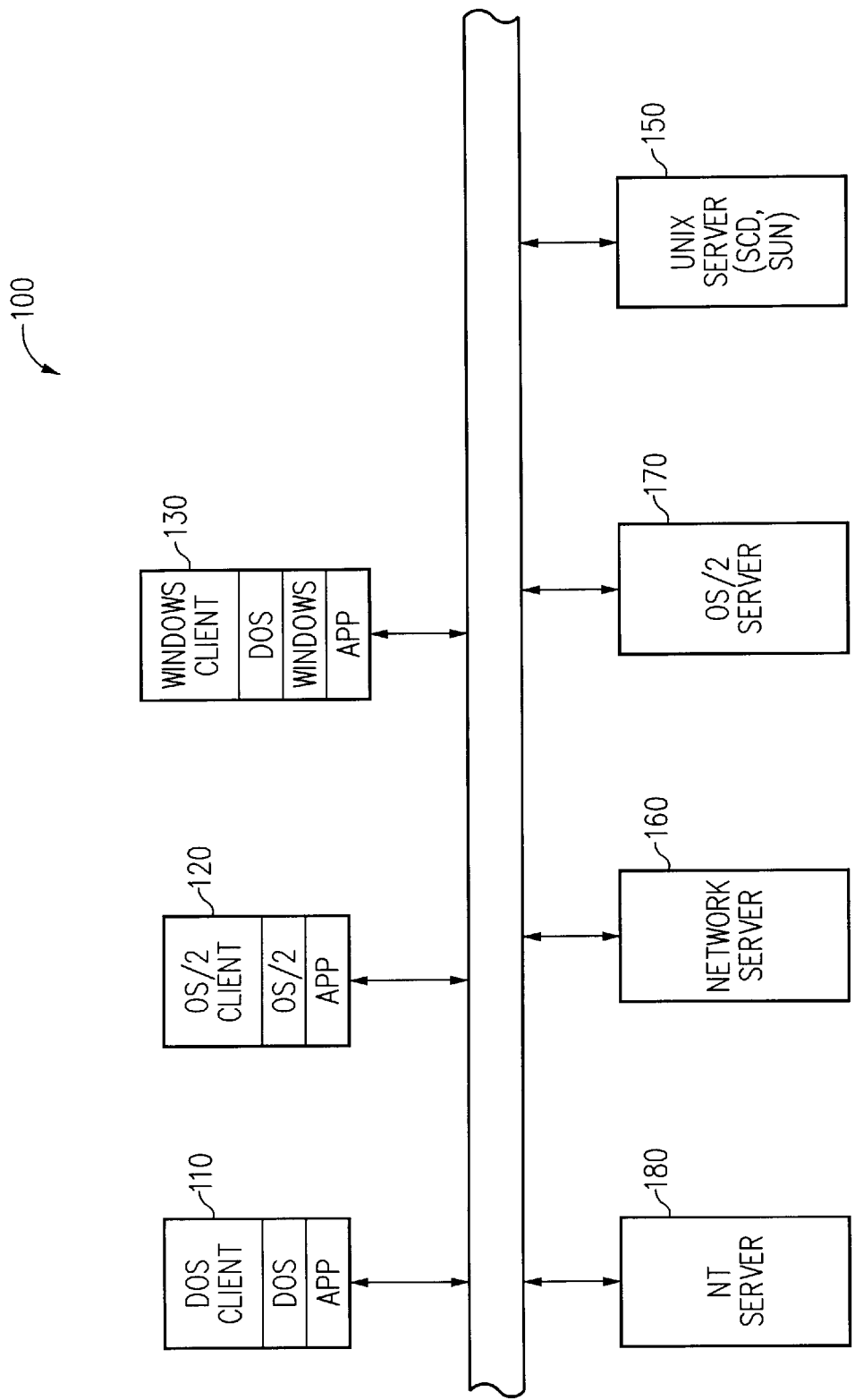
FIG. 1 is a diagram of a prior art heterogeneous network.

According to the principles of this invention, a remote procedure call process for management of components on a heterogeneous network 500 eliminates problems associated with differing versions of the remote procedure call process on a client and a server. The remote procedure call process of this invention minimizes, and in some applications eliminates, updating the remote procedure call modules; simplifies the distribution of updates; and is platform independent.

In this embodiment, heterogeneous network 500 includes multiple types of clients, e.g. Windows client 501, remote client application 511, and OS/2 client 502, and multiple types of servers, e.g., Windows NT server 505, a server computer 520 that includes I/O manager server 530, and Unix server 506. According to the principles of this invention, a remote client component management application programming interface 512 is interposed between a remote client application 511 on a remote client computer 510 and a remote client RPC command module 515. Herein, a client application, application programming interfaces, modules, and stacks are referenced. Those skilled in the art will understand that such applications, interfaces and modules represent software processes that execute on a computer while a network stack represents a combination of software processes and hardware operations.

Remote client component management application programming interface 512 does not directly provide component management function calls with parameters to remote client RPC command module 515, as in prior art RPC. Rather, according to the principles of this invention, in response to a component management function call by remote client application 511, remote client component management application programming interface (API) 512 generates a message RPC_MESSAGE_REQUEST that identifies the called function and the version of remote client component management API 512.

After remote client component management API 512 builds message RPC_MESSAGE_REQUEST, remote client component management API 512 calls a local message transfer RPC command to send message RPC_MESSAGE_REQUEST to remote client RPC command module 515. Consequently, remote client RPC command module 515 supports only a single function call and not each component management function supported by server component management application programming interface 522. This configuration decouples the RPC from the particular version of server component management API 522, and so eliminates the prior art problems associated with incompatible versions of function calls supported by remote client and server RPC command modules 515, and 525 over network 500. This configuration also supports changes to remote client RPC command module 515 without affecting component management APIs 512 and 522, and conversely.

In addition to the single function call for all component management function calls, in one embodiment, administration application programming interface calls by remote client application 511 to component management API 512 are passed to remote client RPC command module 515. Administration application programming interface calls are used to establish a network session, and to ensure the authentication and access rights of remote applications issuing component management function calls.

Thus, in this embodiment, remote client RPC command module 515 supports two sets of operations. A first set of operations processes the local message transfer RPC command, and packages the message for transfer as a RPC over network 500. A second set of operations handles the administration functions supported by the administration API, and packages the administration function call for transfer as a RPC over network 500. In both cases, the message is packaged using the prior art techniques for the particular type of RPC implemented on remote client computer 510.

Figure 2:
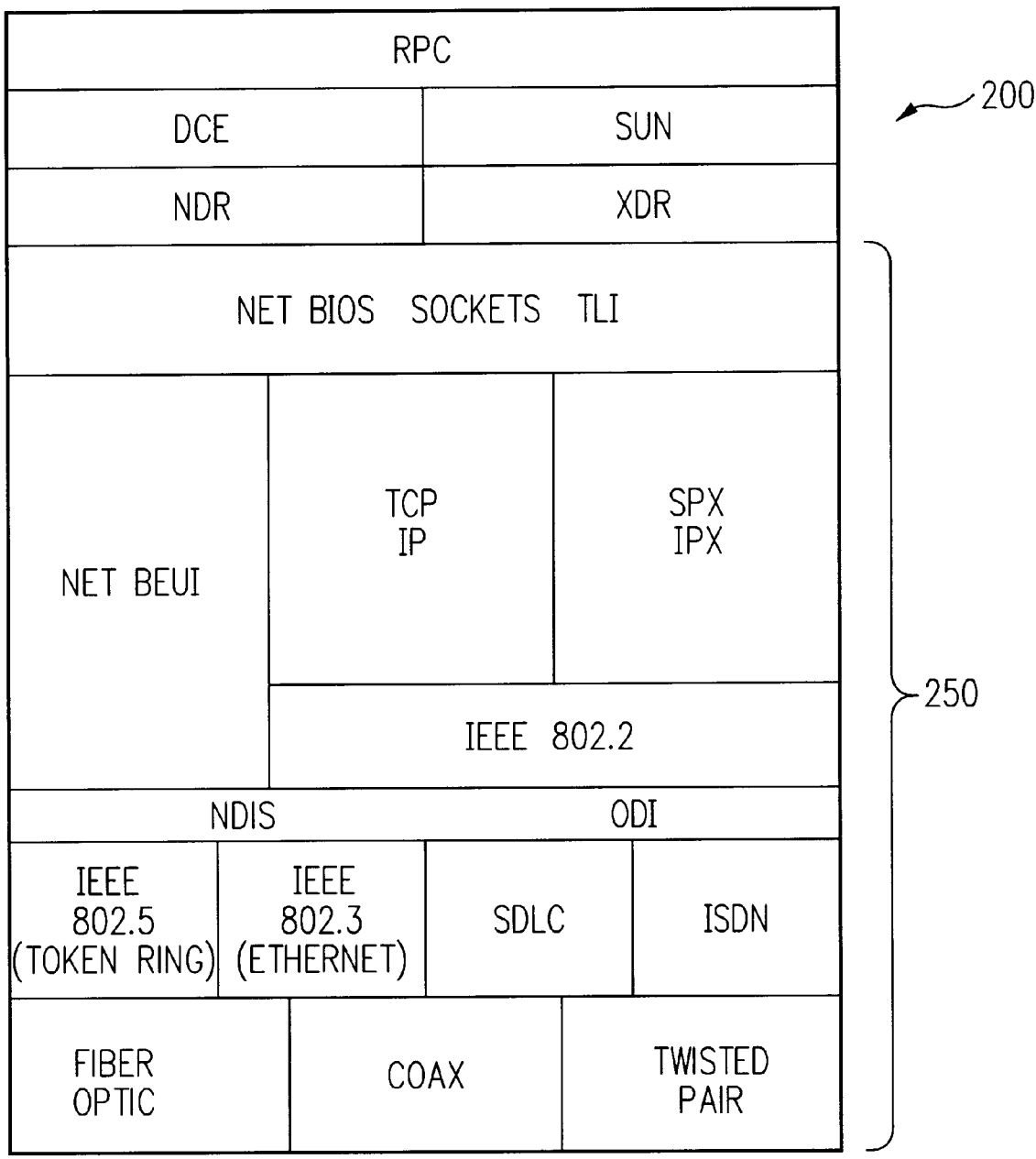
FIG. 2 is an illustration of a prior art network stack.
Figure 3:
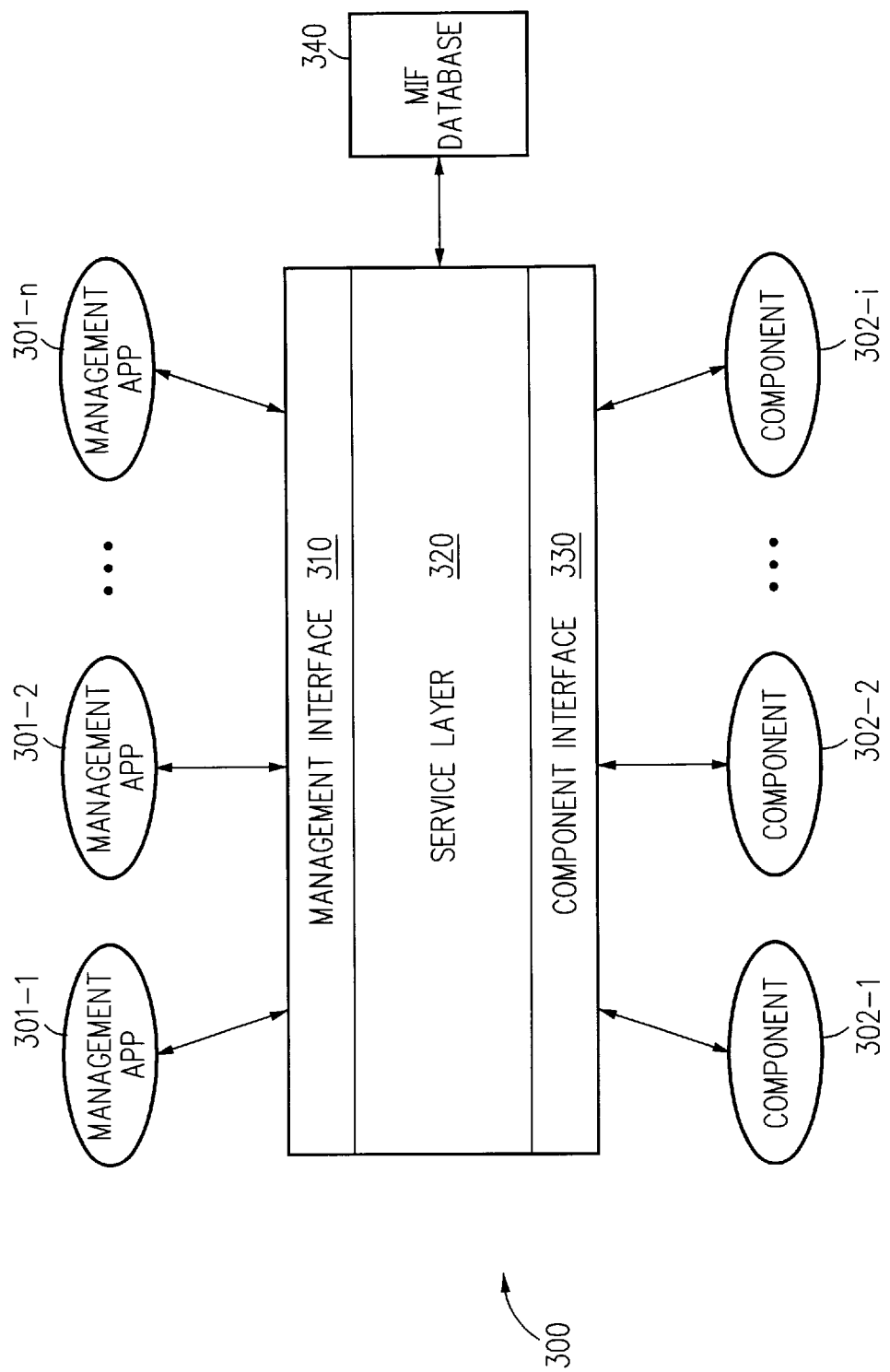
FIG. 3 is a diagram of the prior art desktop management interface in a desktop computer system.

Remote client RPC command module 515 sends the packaged RPC to network stack 516 which in turn transmits the packaged RPC over heterogeneous network 500 to network stack 526 in server computer 520. Any of the various network stacks illustrated in FIG. 2 may used with this invention. Server computer 520 is not identified as any particular type of server, because the principles of this invention are independent of the particular type of server. Those skilled in the art, in view of this disclosure, will be able to implement the invention in a wide variety of servers.

Network stack 526 provides the packaged RPC to server RPC command module 525. Server RPC command module 525 unpacks the packaged RPC in a conventional manner to obtain the RPC. If the RPC is a procedure call to the administration API, server RPC command module 525 processes the procedure call and responds appropriately. If the RPC is the local message transfer RPC command, message RPC_MESSAGE_REQUEST is passed to server component management application programming interface 522.

Server component management application programming interface 522 parses message RPC_MESSAGE_REQUEST passed from server RPC command module 525 to determine the computer architecture of remote client computer 510, e.g., the addressing format used on remote client computer 510. With this information, server component management API 522 reads the version specified in message RPC_MESSAGE_REQUEST. The specified version is compared with the version of server component management API 522. If the specified version is incompatible with the version of server component management API 522, a reply indicating the version incompatibility is placed in the message that in turn is transmitted to remote client application 511 by server component management API 522.

When the specified version is compatible with server component management API 522, message RPC_MESSAGE_REQUEST is passed to I/O manager 530, as message IPC_MESSAGE in a format compatible with I/O manager 530, using standard operating system interprocess communication. As is known to those of skill in the art, the addressing format may not be the same on remote client computer 510 and server computer 520. It is the responsibility of server component management API 522 to assure that message RPC_MESSAGE_REQUEST is converted to message IPC_MESSAGE in a form, e.g., addressing format, that can be processed by I/O manager 530. If no conversion is necessary, message RPC_MESSAGE_REQUEST is simply passed through as message IPC_MESSAGE after the version comparison.

In this embodiment, I/O manager 530 interfaces with a plurality of components 540-1 to 540-n. Components 540-1 to 540-n can include software applications, operating systems, hardware products, peripheral devices, and system hardware. In response to message IPC_MESSAGE, I/O manager 530 performs the called function for the specified component and if necessary places a reply in message IPC_MESSAGE.

I/O manager 530 returns message IPC_MESSAGE, that includes the result, to server component management API 522. Server component management API 522 passes returned message IPC_MESSAGE as message RPC_MESSAGE_RESULT, via the local message transfer RPC command, to server RPC command module 525.

Server RPC command module 525 packages and transmits returned message RPC_MESSAGE_RESULT to network stack 526 which in turn transmits packaged returned message RPC_MESSAGE_RESULT over network 500 to network stack 516 in remote client computer 510. Network stack 516 passes returned message RPC_MESSAGE_RESULT to remote RPC command module 515.

Remote client RPC command module 515, in turn, unpacks and transfers returned message RPC_MESSAGE_RESULT to remote client component management API 512. Remote client component management API 512 extracts the results from the returned message and provides the results in a proper format to remote client application 511 by an interprocess communication. In this embodiment, remote client component management API 512 has the responsibility to convert the format of message RPC_MESSAGE_RESULT if necessary.

Consequently, the component management procedure call by remote client application 511 appears to remote client application 511 as a normal RPC. However, the various remote procedure management function calls supported by server component management API 522 are reduced to a single RPC command that transfers a buffer of data, i.e., message RPC_MESSAGE, and that is independent of the particular versions of RPC command modules 515 and 525 on remote client computer 510 and server computer 520, respectively.

Figure 4:
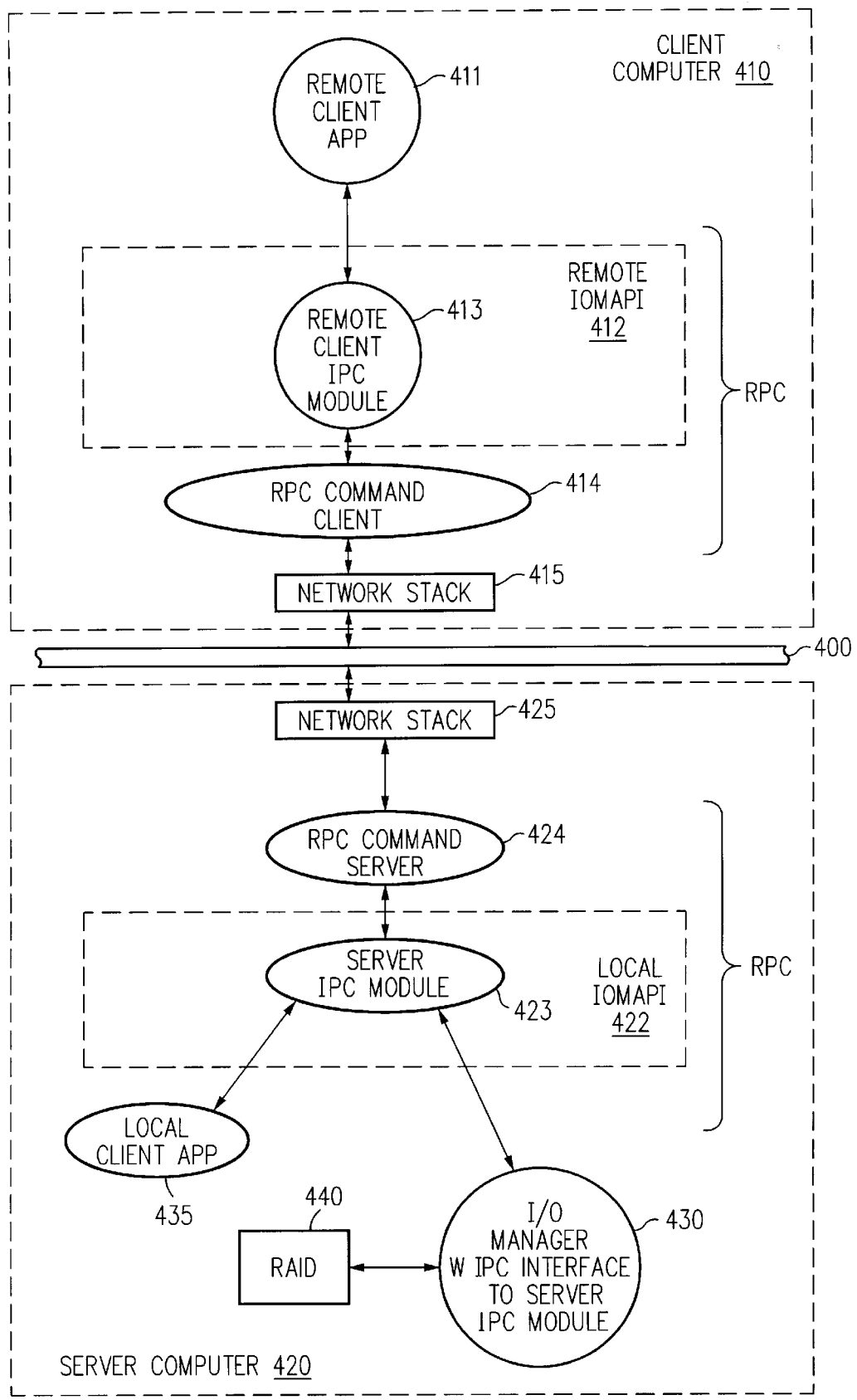
FIG. 4 is an illustration of a structure used to implement RPCs over a heterogeneous network for management of a RAID structure.

Further, RPC command modules 515 and 525 support only the single function call to transfer the buffer of data generated by the component management API. The responsibility for supporting each I/O management function call is removed from RPC command modules 515 and 525 and rests solely with component management APIs 512 and 522. This simplifies RPC command modules 515 and 525 in comparison to the modules of FIG. 4 and makes modules 515 and 525 independent of the particular version of component management APIs 512 and 522. The principles of this invention are applicable in general to client/server applications over a heterogeneous network that utilize RPC and support the buffer transfer function call.

In this embodiment, remote client RPC command module 515 and server RPC command module 525 are executable modules. Application 511 loads executable remote client remote procedure call command module 515 which in turn loads client component management API 512 which is dynamic linked libraries (DLLs). Since client component management API 512 is not statically linked to remote client application 511, a change in API 512 does not require recompiling and relinking of remote client application 511.

In one embodiment, remote client and server RPC command modules 512 and 522 include capability for supporting a plurality of network transport stacks. Also, I/O manager 530, in response to a component event builds an event message EV_MESSAGE characterizing the event and passes event message EV_MESSAGE to server component management API 522 using an interprocess communication.

Server component management API 522 in turn calls the local message transfer RPC command to send event message EV_MESSAGE to server RPC command module 525. While message EV_MESSAGE includes different information than messages RPC_MESSAGE_REQUEST and RPC_MESSAGE_RESULT, RPC command modules 515 and 525 see only a buffer of information and so their operation is not affected by the differences in the messages.

Message EV_MESSAGE, that characterizes the event, is packaged and transmitted over heterogeneous network in a manner similar to that described above and is provided to remote client component management API 512. For an event, client component management API 512 converts the format of message EV_MESSAGE, if necessary, and provides the information to remote client application 511. Since APIs 512 and 522 are equivalent and RPC command modules 515 and 525 are equivalent, the transmission of event notifications from a server to a client is facilitated.

Figure 6A:
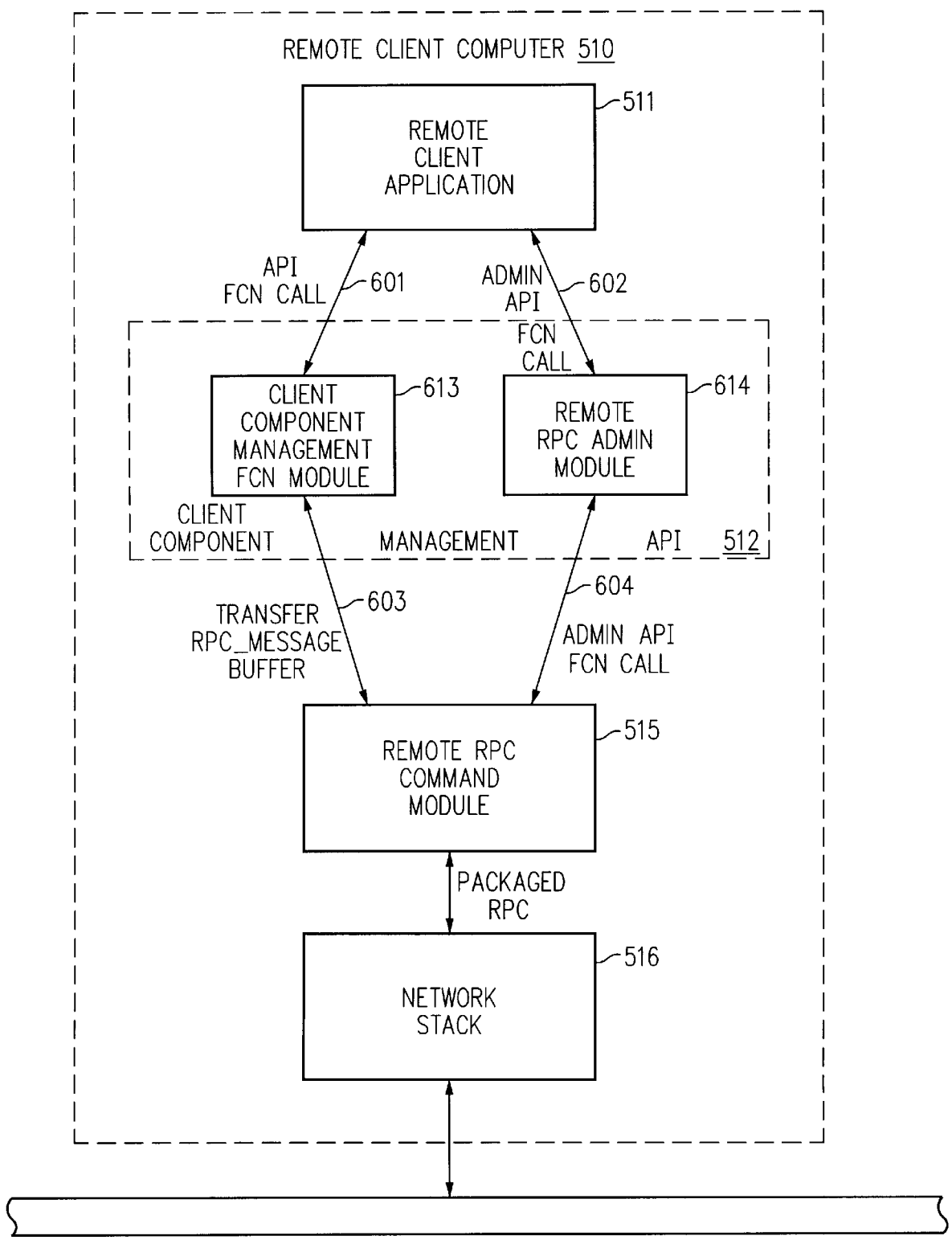
FIGS. 6A and 6B are a more detailed illustration of the structure and process of this invention for implementing, over heterogeneous networks, version independent RPCs for component management.

FIG. 6A is a more detailed block diagram of remote client computer 510, and in particular of remote client component management application programming interface 512. In this embodiment, remote client component management API 512 include two modules, a client component management function module 613, and a remote remote procedure call administration module 614. Appendix B, which is incorporated herein by reference in its entirety, is one embodiment of general I/O management functions that are included in module 613. Appendix C, which is incorporated herein by reference in its entirety, is one embodiment of specific RAID structure management functions that are also included in module 613. As indicated above, the information in Appendices B and C is also included in server component management function module 623, that is described more completely below.

According to the principles of this invention, a remote client Windows 3.1 application uses LoadLibrary(), GetProcAddress() and FreeLibrary() APIs to access the I/O management API functions in client component management function module. Client application 511 is required to make all calls to remote client component management API 512 absolutely dynamically.

To assure that remote client application 511 and component management function module 613 are synchronized, i.e., component management function module 613 knows the type of remote client application 511 and the machine byte-order, remote client application 511 is required to call a component management API function that initializes remote client component management function module 613 before calling any other functions in module 613. One example of a call definition for such a function is presented in Appendix B. If the initialization function is not called first, all functions calls to module 613 by remote client application 511 return an error.

Administration API calls 602 by remote client application 511, for example a Windows graphical user interface, to remote RPC administration module 614 of client component management API 512 are used to establish a network session, and to ensure the authentication and access rights of remote applications issuing component management function calls. Table 1 is an example of administration functions supported in one embodiment of this invention.

TABLE 1

EXAMPLES OF FUNCTIONS IN
REMOTE PROCEDURE CALL ADMINISTRATION MODULE

| Open Session | Close Session |
|---|---|
| Change Timeout | Change Retry Timeout |
| Server Login | Server Logout |
| Notify Active | Notify Add Entry |
| Notify Remove Entry | Get Next Notify Entry |

Table 1 contains only the names of representative functions. Those skilled in the art can implement a wide variety of functions in remote RPC administration module 614. Consequently, the particular functions identified in Table 1 are illustrative only and are not intended to limit remote RPC administration module 614 to the particular functions named in TABLE 1.

When such an administration API call is transported to server RPC command module 525, server RPC command module 525, in addition to responding to the administration API call, maintains a database of information characterizing the registered remote clients. This database is similar to those in the prior art and so is not described further. However, in addition to the typical prior art information, the database also includes event registration information so that server RPC command module 525 knows which remote clients to send each event message that is received from I/O manager 530.

A remote client function call 601 to one of a plurality of functions provided by remote client component management function module 613 does not result in passing a function call with parameters to remote RPC command client module 515, as described above. Rather according to the principles of this invention, in response to function call 601 to remote client component management function module 613, component management function module 613 builds, in a buffer memory, a message RPC_MESSAGE_REQUEST that identifies at least the called function, and the version of the remote client component management function module 613, i.e., the version of remote client component management API 512. In this embodiment, the information in message RPC_MESSAGE_REQUEST is one-byte-aligned, i.e., message RPC_MESSAGE is one-byte-aligned. Appendix A, which is a part of the present disclosure and which is incorporated herein by reference in its entirety, is one example of a definition for the message built in the buffer memory. In the embodiment of Appendix A, the message includes a plurality of fields. The information in the plurality of fields includes a byte order of the message, i.e., information characterizing the architecture of remote client computer 510; a size of the message; a major version identifier of remote client component management API 512; a minor version identifier of remote client component management API 512; a message tag; an identifier for remote client process 511 that receives the result of the message; a message type identifier, e.g., a request or a result; a length of any data transmitted in the message; a command, i.e., a function call; and space for the result of the function call.

In this embodiment, component management function module 613 includes an XDR module. However, as indicated above, according to the principles of this invention, only the receiving API converts message RPC_MESSAGE to a format compatible with the architecture of the receiving computer, if necessary. (Herein, if only reference numeral RPC_MESSAGE is used, the description applies to both the request message and the result message). Consequently, in response to a call by remote client application 511 to a function provided by remote client component management function module 613, component management function module 613 does not utilize the XDR module. In this embodiment, client component management function module 613 utilizes the XDR module for event messages from I/O manager 530, if necessary.

Upon completion of message RPC_MESSAGE_REQUEST, component management module 613 calls a local message transfer RPC command 603 to send the message to remote client RPC command module 515. As explained above, remote RPC command module 515 has two sets of operations.

The first set of operations processes the local message transfer RPC command, and packages message RPC_MESSAGE_REQUEST for transfer as a RPC over network 500. For example, if the message is in a different format than that used for RPC commands over network 500, remote RPC command module 515 converts the message to the proper RPC format as in the prior art RPC methods. As explained above, the particular operations performed by remote client RPC command module 515 depend, for example, on whether the DCE RPC method or the SUN Microsystems' RPC method is utilized.

A second set of operations in remote client RPC command module 515 handles the administration functions supported by RPC administration module 614. Specifically, in response to administration function call 604, remote client RPC command module 515 packages the administration function call for transfer as a RPC over network 500.

Remote client RPC command module 515 is independent of the functions supported by remote client component management function module 613, because remote client RPC command module 515 only processes the single local message transfer RPC command for every function supported by module 613. Thus, the RPC interface across network 500 is independent of the version of remote client component management function module 613.

This means that different versions of component management application programming interfaces 512 and 522 on remote client computer 510 and server computer 520, respectively, no longer have the possibility of hanging either or both of computers 510 and 520.

Figure 6B:
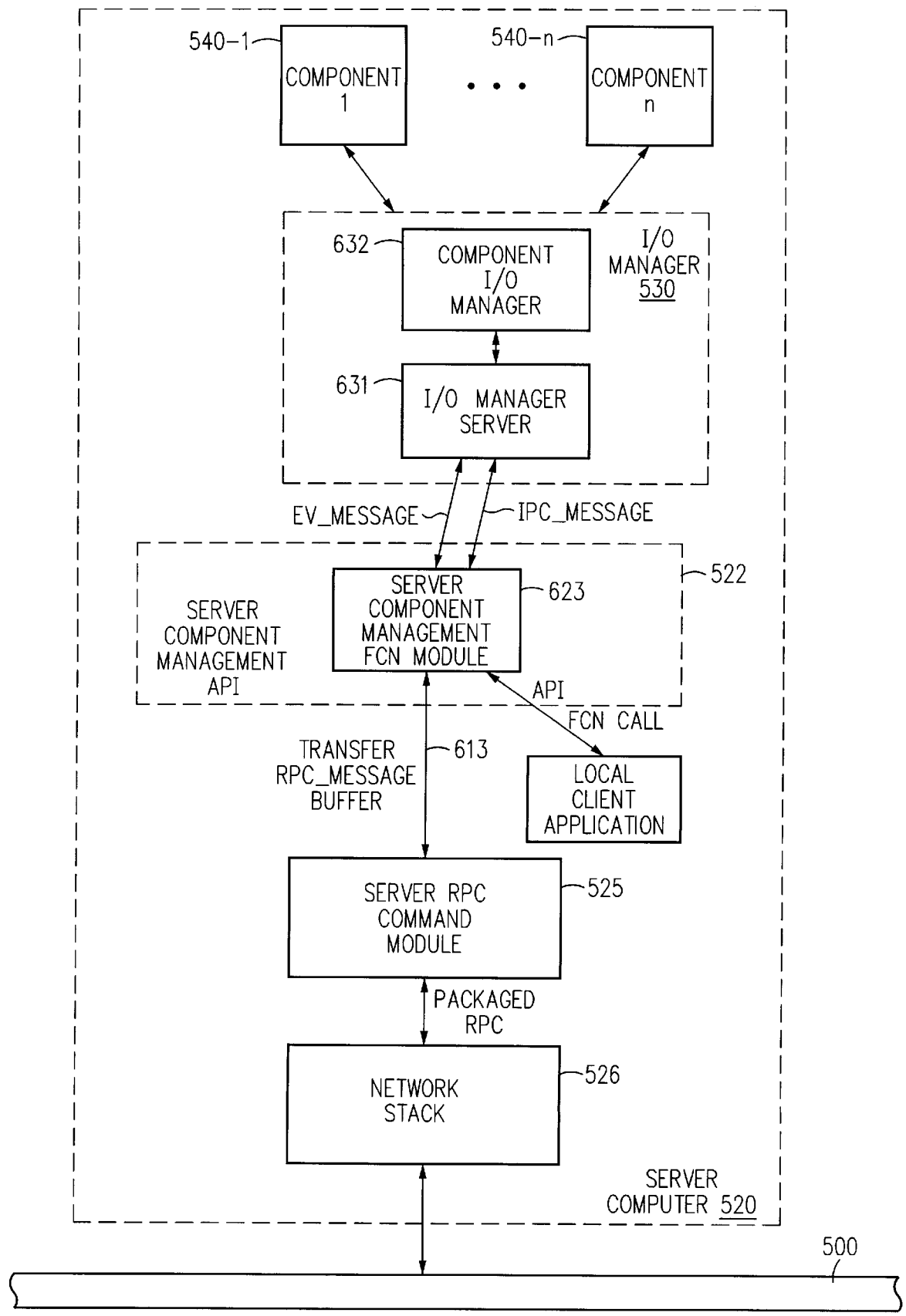

As explained above, remote client RPC command module 515 sends the packaged RPC to network stack 516 which in turn transmits the packaged RPC over network 500 to network stack 526 in server computer 520 (FIG. 6B). Network stack 526 provides the packaged RPC to server RPC command module 525.

Server RPC command module 525 unpacks the packaged RPC in a conventional manner. If the RPC is a RPC administration function call, server RPC command module 525 processes the RPC administration function call and responds appropriately. If the RPC is the local message transfer RPC command, a buffer containing message RPC_MESSAGE_REQUEST is passed to server component management function module 623 in server component administration API 522. Notice that local client applications 627 on server computer 520 also issue component management interface function calls to server component management API 522.

Server component management function module 623 parses message RPC_MESSAGE_REQUEST passed from server RPC command module 525 to determine the client machine architecture specified in message RPC_MESSAGE_REQUEST. In the message format of Appendix A, a byte order field is used to indicate the computer architecture of remote client computer 510. The information in byte order field is independent of the order that the byte order field is processed. Consequently, the byte order field is read correctly independent of the addressing method used by a particular computer architecture.

When message RPC_MESSAGE_REQUEST is in a format that is different from that processed by I/O manager server 631, server component management function module 623 converts the format of message RPC_MESSAGE_REQUEST to a neutral canonical format message IPC_MESSAGE using an external data representation (XDR) that is similar in function to the XDR provided by Sun Microsystems. For example, if the message is in a Little-Endian addressing format, and server computer 520 uses Big-Endian addressing, server component management function module 623 converts message RPC_MESSAGE_REQUEST to message IPC_MESSAGE in a Big-Endian message format.

The conversion of a message at the computer receiving the message has several advantages. First, no conversion is required if both the sending computer and the receiving computer have a common architecture. Second, when necessary, the conversion of commands to I/O manager 530 is done only on the server computer which is typically more powerful than the client computer.

After server component management function module 623 assures that the message is in a format compatible with server computer 520, server component management function module 623 reads the version specified in the message. For the embodiment of the message in Appendix A, the version includes both a major version identifier and a minor version identifier. If the version is compatible with server component management API 522, e.g., both the major and minor versions are compatible, processing of message RPC_MESSAGE_REQUEST continues, as described below.

However, if the version is incompatible with server component management API, an error status is placed in message RPC_MESSAGE by server component management function module 623. Server component management function module 623 changes the message type to result in message RPC_MESSAGE_REQUEST to obtain message RPC_MESSAGE_RESULT. Module 623 calls the message transfer RPC command 603 to send message RPC_MESSAGE_RESULT to server RPC command module 525. In this instance, no message is transmitted to I/O manager 530. When the version is compatible with server component management API 522, either the converted message, when the computer architectures of remote client computer 510 and server computer 520 are different, or the original message, when the computer architectures of remote client computer 510 and server computer 520 are compatible, is passed as message IPC_MESSAGE by an interprocess communication from server component management function module 623 to I/O manager server for interprocess communication 631. Message IPC_MESSAGE is a buffer that is used to transmit procedure calls to particular functions of I/O manager server for interprocess calls 631.

In response to message IPC_MESSAGE, I/O manager server for interprocess communication 631 issues a call to the appropriate management function in component I/O manager server 632. Component I/O manager server 632 performs the called management function for the specified component and returns the result to I/O manager server for interprocess communication 631. The particular operations performed by component I/O manager 632 and the interactions between I/O manager server for interprocess communication 631 and component I/O manager server 530 are similar to those that would be performed in a prior art component I/O manager.

I/O manager server for interprocess communication 631, in response to the result for the called management function for component 540, places the result in message IPC_MESSAGE and returns message IPC_MESSAGE to server component management function module 623.

Figure 5:
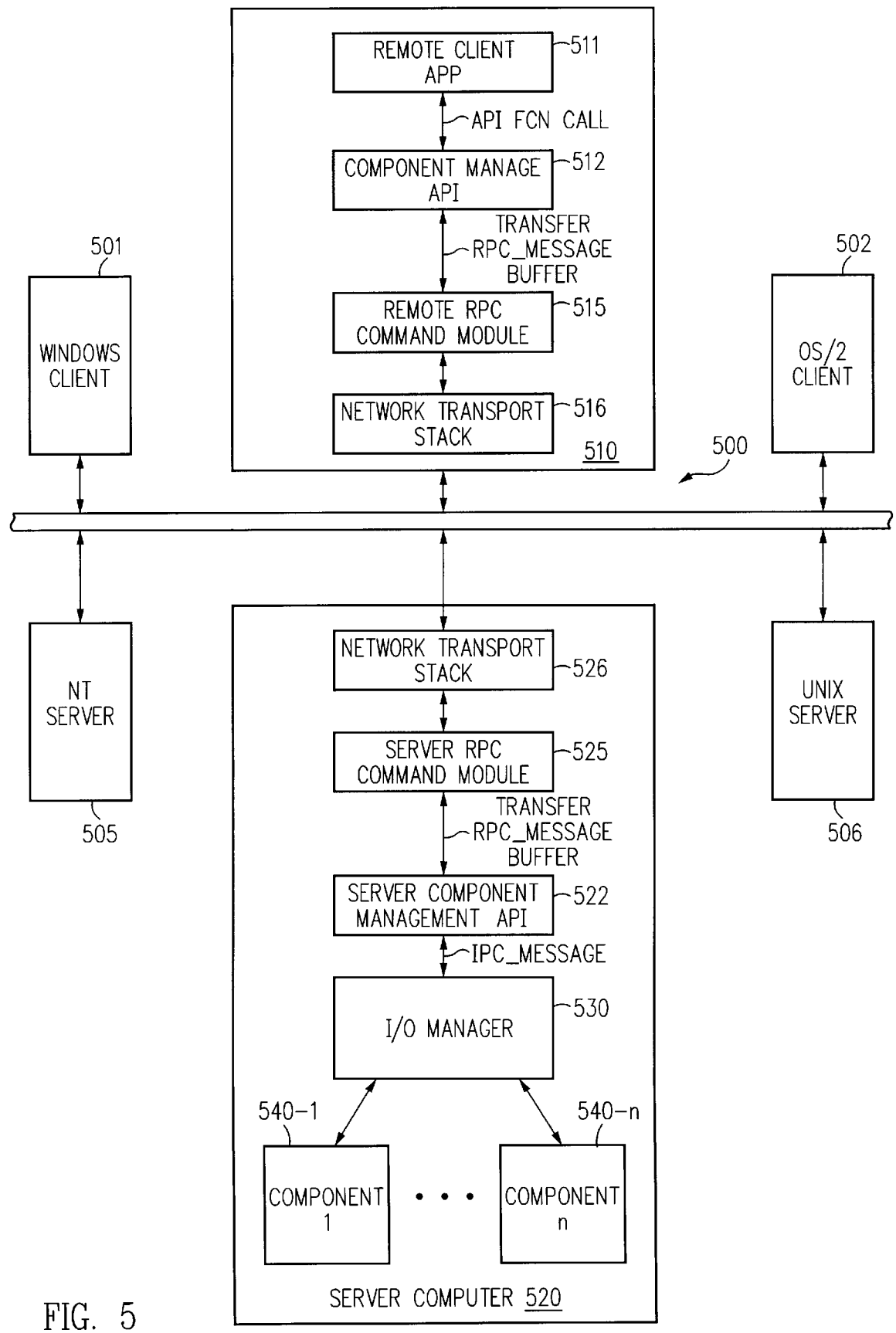
FIG. 5 is an illustration of a structure and process of this invention for implementing, over heterogeneous networks, version independent RPCs for component management.

Server component management function module 623 changes the type of message in the message buffer containing message RPC_MESSAGE_REQUEST and places the result from message IPC_MESSAGE in message RPC_MESSAGE_REQUEST. Module 623 calls the local message transfer RPC command to transfer message RPC_MESSAGE_REQUEST to server RPC command module 525 as message RPC_MESSAGE_RESULT. Notice that message RPC_MESSAGE_REQUEST and message RPC_MESSAGE_RESULT are really the same structure. The different reference numerals are used to assist in understanding the communication flow and are not intended to limit the invention in any way. Message RPC_MESSAGE_RESULT is transferred to remote client computer 510 and processed as described above with respect to FIG. 5.

In this embodiment, component management function module 613 and component management function module 623 are functionally similar. Both modules 613 and 623 build a message in response to a component management application programming interface function call. In the case of remote client 511, the message must be transported over network 500 to be presented to I/O manager server 521, while for local client application 627, module 623 must only pass the message locally using an interprocess communication.

Since component management modules 613 and 623 handle all component management function calls, RPC command modules 515 and 525 are independent of any particular component management function. Consequently, any change in RPC command modules 515 and 525 does not require regenerating, compiling and linking of remote client application 511, module 613 and module 623.

In the previous embodiment, an I/O management function was called by client application 511, a message in a memory buffer was built by client component management function module 613 and transmitted by remote client RPC command module 515 to server computer 520. However, events can occur with respect to one or more of components 540-1 to 540-n that may affect the operation of a client application such as remote client application 511.

Consequently, in one embodiment of this invention, an event server process within I/O manager 530 builds an event message EV_MESSAGE. One embodiment of event message EV_MESSAGE is presented in Appendix B, which is incorporated herein by reference in its entirety. After event message EV_MESSAGE is built in a buffer memory of server computer 520, event message EV_MESSAGE is passed to server component management function module 623 via an interprocess call.

Server component management function module 623 maintains a database of local clients on server computer 520 that have registered for events. In this embodiment, server RPC command module 525 and local client application 627 are local clients of server component management API 522. Event message EV_MESSAGE is transmitted by server component management function module 623 to each local client that has registered for the event message.

In this embodiment, server RPC command module 525 has registered for the event message. Consequently, server component management function module 623 calls a local message transfer RPC to transfer the message buffer containing message EV_MESSAGE to server RPC command module 525.

As indicated above, RPC command module 525 maintains a database of remote clients that registered to receive notification of an event message EV_MESSAGE. RPC command module 525 packages message EV_MESSAGE and sends the message to each registered remote client. RPC command module 525 sends the packaged message to network stack 526, which in turn transmits the packaged message to the remote client computer.

In this embodiment, the operation of server computer 520 and remote client computer 510 are effectively reversed because the event message buffer is filled by I/O manager 530 and subsequently transmitted to remote client computer 510 by server component management function module 623 using a local message transfer RPC from server RPC module 525.

Thus, the operations in the transfer of the event message are the same as those described above with the change in direction of the message taken into account. Thus, the operation of the local message transfer RPC command, and the operation of RPC command modules 515 and 525, and network stacks 516 and 526 is not repeated herein in further detail. However, it is noted that RPC command modules 515 and 525 could be implemented so that one executable module is called for events and another executable module is called for API function calls.

In another embodiment, remote RPC command modules 515 and 525 support operations over a plurality of transport stacks within network stacks 516 and 526 for example transport stacks that support the TCP/IP and SPX protocols. This allows client RPC command module 515 to communicate with server RPC command modules on both similar and different network transport protocols. In this embodiment, remote RPC command module 515, for example, includes a particular executable module for each transport protocol stack. Remote client application 511 loads a particular executable remote RPC command module to use one of the plurality of network transport protocols for a task. All further RPC communications to and from application 511 for that task use that network transport protocol until the task exits. The same task can not issue calls to different network transport stacks concurrently. However, two different tasks may use different network transport stacks even though the tasks share client component management API 512.

In one embodiment of this invention, as indicated above, the client application is a Windows 3.1 application, and remote RPC command modules 515 and 525 are executable modules while component management APIs 512 and 522 are dynamically linked libraries. The invention was implemented using the EZ-RPC compiler provided by NobleNet, Inc., 337 Turnpike Rd., Southboro, Mass. 01772 and related tools available from NobleNet, Inc. to generate a portion of modules 515 and 525.

The embodiments of the invention described above are only illustrative of the principles of this invention. In view of this disclosure, those skilled in the art can implement a variety of application programming interfaces and the message transfer RPC commands to eliminate the problems associated with using RPCs over heterogeneous networks. The use of the single RPC command over heterogeneous networks eliminates the problems associated with conventional RPCs and a variety of versions of one or more APIs on the heterogeneous network.

We claim:

1. A computer process for using remote procedure calls over a heterogeneous computer network comprising:
    filling a message buffer in a first computer with information including a version of an application programming interface on said first computer by a client application, executing on said first computer, calling a management function in said application programming interface, wherein said first computer is on said heterogeneous computer network; and
    issuing a message transfer remote procedure call by said application programming interface to transfer said message buffer over said heterogeneous computer network to a second computer;
        wherein said local message transfer remote procedure call is used for management functions in said application programming interface;
        said message transfer remote procedure call is used to tranfer all message buffers; and
        said message transfer remote procedure call is independent of said information in said message buffer.

2. A computer process for using remote procedure calls over a heterogeneous computer network as in claim 1 wherein said filling said message buffer comprises aligning said information in said message buffer so that said information is one byte-aligned.

3. A computer process for using remote procedure calls over a heterogeneous computer network as in claim 1 further comprising:
    comparing said version of said application programming interface in said message buffer with a version of an application programming interface on said second computer.

4. A computer process for using remote procedure calls over a heterogeneous computer network as in claim 3 wherein said comparing said version of said application programming interface in said message buffer with a version of an application programming interface on said second computer further comprises:
    comparing a plurality of version identifiers of said application programming interface on said first computer with a plurality of version identifiers of said application programming interface on said second computer.

5. A computer process for using remote procedure calls over a heterogeneous computer network as in claim 3 further comprising:
    continuing processing of information in said message buffer by said application programming interface on said second computer upon said comparing said version of said application programming interface in said message buffer with a version of an application programming interface on said second computer indicating that said versions are compatible.

6. A computer process for using remote procedure calls over a heterogeneous computer network as in claim 1 wherein said management function is an I/O management function and said application programming interface is a component management application programming interface.

7. A computer process for using remote procedure calls over a heterogeneous computer network comprising:
    issuing a component management function call from a remote client application on a remote client computer to a remote client component management application programming interface on said remote client computer, wherein said remote client computer is on said heterogeneous computer network;
    building a message in a buffer memory of said remote client computer by said remote client component management application programming interface wherein said message includes an identifier for the called component management function; and a version of the remote client component management application programming interface; and
    sending said message to a server computer on said heterogeneous computer network using a remote procedure call command module wherein said remote procedure call command module is independent of said called component management function.

8. A computer process for using remote procedure calls over a heterogeneous computer network as in claim 7 wherein said sending said message to a server computer on said heterogeneous computer network further comprises:
    calling a local message transfer remote procedure call command by said client component management API to transfer said message from said remote client component management application programming interface to a remote client remote procedure call module (RPC)on said client computer.

9. A computer process for using remote procedure calls over a heterogeneous computer network as in claim 8 wherein said sending said message to a server computer on said heterogeneous computer network further comprises:
    packaging said message for transfer over said heterogeneous computer network by said remote client RPC command module.

10. A computer process for using remote procedure calls over a heterogeneous computer network as in claim 9 wherein said sending said message to a server computer on said heterogeneous computer network further comprises:
    transmitting said packaged message from said remote client RPC command module to a first network stack on said client computer;

transmitting said packaged message from said first network stack to a second network stack on a server computer; and transmitting said packaged message from said second network stack to a server RPC command module on said server computer wherein said server RPC command module converts said packaged message back to said message.

11. A computer process for using remote procedure calls over a heterogeneous computer network as in claim 10 further comprising:

transferring said message from said server RPC command module to a server component management application programming interface on said server computer.

12. A computer process for using remote procedure calls over a heterogeneous computer network as in claim 11 further comprising:

reading a field in said message by said server component management application programming interface to determine whether an addressing format of said client computer is compatible with an addressing format of said server computer.

13. A computer process for using remote procedure calls over a heterogeneous computer network as in claim 12 further comprising:

converting said message to an addressing format compatible with said server computer upon said server component management application programming interface determining that the addressing format of said client computer is incompatible with said addressing format of said server computer.

14. A computer process for using remote procedure calls over a heterogeneous computer network as in claim 7 wherein said message is one byte-aligned.

15. A computer process for using remote procedure calls over a computer network comprising:

placing a command in a message buffer by a computer process executing on a first computer connected to said computer network wherein said command is for another computer process executing on a second computer connected to said computer network; and using a single remote procedure call to transfer all message buffers over said network computer network so that said single remote procedure call is used independent of the command in said message buffer and said single remote procedure call is used by said first computer to transfer said message buffer to said second computer.

* * * * *